(12) United States Patent
Stegmann et al.

(10) Patent No.: US 10,093,275 B2
(45) Date of Patent: Oct. 9, 2018

(54) METHOD FOR CONTROLLING THE SPEED OF AN ELECTRIC MOTOR OF A BELT RETRACTOR

(71) Applicant: TRW AUTOMOTIVE SAFETY SYSTEMS GMBH & CO KG, Aschaffenburg (DE)

(72) Inventors: Volker Stegmann, Aschaffenburg (DE); Norbert Staudt, Aschaffenburg (DE)

(73) Assignee: TRW Autmotive Safety Systems GmbH & CO. KG (DE)

(*) Notice: Subject to any disclaimer, the term of this patent is extended or adjusted under 35 U.S.C. 154(b) by 0 days.

(21) Appl. No.: 15/314,957

(22) PCT Filed: Jun. 11, 2015

(86) PCT No.: PCT/EP2015/001171
§ 371 (c)(1),
(2) Date: Nov. 30, 2016

(87) PCT Pub. No.: WO2015/192950
PCT Pub. Date: Dec. 23, 2015

(65) Prior Publication Data
US 2017/0197581 A1 Jul. 13, 2017

(30) Foreign Application Priority Data
Jun. 16, 2014 (DE) .................. 10 2014 008 547

(51) Int. Cl.
*B60R 22/44* (2006.01)
(52) U.S. Cl.
CPC ...... *B60R 22/44* (2013.01); *B60R 2022/4473* (2013.01)

(58) Field of Classification Search
CPC .................. B60R 2022/4473; B60R 22/44
(Continued)

(56) References Cited

U.S. PATENT DOCUMENTS

| 4,669,680 A * | 6/1987 | Nishimura | B60R 22/44 180/268 |
| 6,290,159 B1 * | 9/2001 | Specht | B60R 22/3413 242/379.1 |

(Continued)

FOREIGN PATENT DOCUMENTS

| EP | 1369320 | 10/2003 |
| EP | 1591328 | 11/2005 |
| EP | 1651478 | 5/2008 |

*Primary Examiner* — Tyler J Lee
(74) *Attorney, Agent, or Firm* — Tarolli, Sundheim, Covell & Tummino LLP

(57) ABSTRACT

A method of controlling the motor speed of an electric retractor motor (18) of a belt retractor (10) for reducing a belt slack in the comfort mode comprises the following steps of:
a) measuring the motor current ($I_M$) applied to the retractor motor (18) as well as the voltage applied to the retractor motor (18),
b) estimating the motor speed taking the time curve of the motor current ($I_M$) applied to the retractor motor (18), the curve of the voltage as well as plural motor parameters ($R_M$, $I_M$, $K_M$) into account,
c) adapting the motor current ($I_M$) in response to the estimated motor speed, and
d) repeating the steps a) to c) until the estimated motor speed has reached a defined value.

4 Claims, 1 Drawing Sheet

(58) Field of Classification Search
USPC .......................................................... 701/45
See application file for complete search history.

(56) References Cited

U.S. PATENT DOCUMENTS

| | | | | |
|---|---|---|---|---|
| 6,427,935 | B1* | 8/2002 | Fujii | B60R 22/44 242/390.8 |
| 6,729,650 | B2* | 5/2004 | Midorikawa | B60R 21/01 280/801.1 |
| 7,475,840 | B2* | 1/2009 | Heckmayr | B60R 22/44 242/374 |
| 7,686,118 | B2* | 3/2010 | Akaba | B60R 21/013 180/268 |
| 8,068,956 | B2* | 11/2011 | Beisheim | B60R 22/46 180/268 |
| 8,612,098 | B2* | 12/2013 | Fouilleul | B60R 21/013 701/45 |
| 2002/0125360 | A1* | 9/2002 | Peter | B60R 22/44 242/374 |
| 2003/0178836 | A1* | 9/2003 | Viano | B60R 22/44 280/806 |
| 2003/0224887 | A1* | 12/2003 | Bullinger | B60R 22/46 474/101 |
| 2004/0056471 | A1* | 3/2004 | Bullinger | B60R 21/01 280/806 |
| 2006/0097096 | A1 | 5/2006 | Heckmayr | |

* cited by examiner

METHOD FOR CONTROLLING THE SPEED OF AN ELECTRIC MOTOR OF A BELT RETRACTOR

RELATED APPLICATIONS

This application corresponds to PCT/EP2015/001171, filed Jun. 11, 2015, which claims the benefit of German Application No. 10 2014 008 547.3, filed Jun. 16, 2014, the subject matter of which are incorporated herein by reference in their entirety.

BACKGROUND OF THE INVENTION

The invention relates to a method of controlling the engine speed of an electric retractor motor of a belt retractor in an especially load-independent manner.

From the state of the art various methods are known to eliminate a belt slack of a vehicle seat belt. It is the objective of said methods to safeguard prior to a case of restraint that the webbing of the seat belt contacts the vehicle occupant so that during deceleration of the vehicle no unnecessary forward movement of the vehicle occupant takes place and thus the latter can participate m the total deceleration of the vehicle as quickly as possible.

On the one hand, retraction of the webbing and elimination of the belt slack is intended to be performed very quickly in the so called pre-crash mode, i.e. when a critical driving situation is given. On the other hand, the belt slack is desired to be eliminated as conveniently as possible for the vehicle occupant during normal driving operation and, resp., after fastening the seat belt (in the comfort mode). From EP 1 661 478 B1 a method is known, for example, which as a command variable for controlling said process makes use of the motor torque of an electric retractor motor that is resulting from the motor current. When the webbing is in contact with the vehicle occupant, a higher torque is required to wind up the webbing so that the motor current increases. The increase in the motor current can be measured and, upon reaching a defined value, the motor torque can be reduced. In this method it is a problem that with a large belt slack at first no or only a low resistance is provided when the webbing is retracted. In this case, the webbing can be retracted very quickly, which may result in irritations of the vehicle occupant.

In order to eliminate this problem methods are known for measuring the speed of the belt reel and, resp., the retracting speed of the webbing via additional sensors, for example Hall sensors. These systems enable an adaptation of the motor speed and thus of the retracting speed of the webbing to values comfortable to the vehicle occupant.

These methods require additional sensors, however, which render the belt retractor more complicated and thus more expensive. In addition, for these sensors and a possibly required evaluating and control unit additional construction space is necessary.

SUMMARY OF THE INVENTION

It is the object of the invention to provide a method of controlling an electric retractor motor of a belt refractor for reducing the belt slack in the comfort mode which enables simple control of the motor speed of the electric motor so that the belt slack is eliminated in an as comfortable manner as possible for the vehicle occupant.

For achieving the object a method of controlling the motor speed of an electric retractor motor of a belt retractor is provided for reducing the belt slack in the comfort mode, comprising the following steps of:
a) measuring the motor current applied to the retractor motor as well as the voltage applied to the retractor motor,
b) estimating the motor speed taking the time curve of the motor current applied to the retractor motor, the time curve of the voltage as wed as plural motor parameters into account,
c) adapting the motor current in response to the estimated motor speed, and
d) repeating the steps a) to c) until the estimated motor speed has reached a defined value.

The speed of the motor is dependent on the terminal voltage applied to the motor. When the time curve of the current flowing in the retractor motor and the time curve of the voltage applied to the retractor motor are measured, an estimation of the motor speed may be performed in this way without additional sensors being required.

Preferably a pulse-width modulated operating voltage is established from the voltage curve measured on the retractor motor. Via said pulse width of the operating voltage the speed of the electric motor may be estimated.

In order to obtain better estimation of the motor speed various motor parameters are required. Said motor parameters may be, for example, the electric motor resistance of the retractor motor, the motor inductivity of the refractor motor and a motor-dependent constant which will be established in advance. Said motor parameters can be established in advance by measurements and can be stored in a memory.

Preferably the motor speed is estimated by the following formula:

$$\omega = \frac{U_M - R_M * I_M - L_M * \frac{dI_M}{dt}}{K_M}$$

wherein
ω=angular speed of the rotor of the retractor motor
$U_M$=motor terminal voltage
$R_M$=motor resistance of the retractor motor
$I_M$=motor current applied to the retractor motor
$L_M$=motor inductivity of the retractor motor
$dI_M/dt$=time curve of the motor current applied to the retractor motor
$K_M$=motor constant.

Since all parameters listed in the formula are known or can be established in a simple manner, the angular speed of the retractor motor and thus the speed can be easily estimated therefrom. When said speed has been estimated, by the steps c) and d) the motor speed can be regulated until a value of the motor speed convenient to the vehicle occupant or a value of the motor speed defined in advance has been reached.

The motor terminal voltage, i.e. the voltage applied to the retractor motor, may be established, for example, from the duty factor of the pulse width modulation and the bridge supply voltage, wherein:

$U_M=DC*U_B$

Wherein
DC=duty factor of pulse width modulation
$U_B$=bridge supply voltage.

BRIEF DESCRIPTION OF THE DRAWINGS

Further advantages and features can be inferred from the following description in combination with the enclosed drawings, in which.

DESCRIPTION

Figure 1:
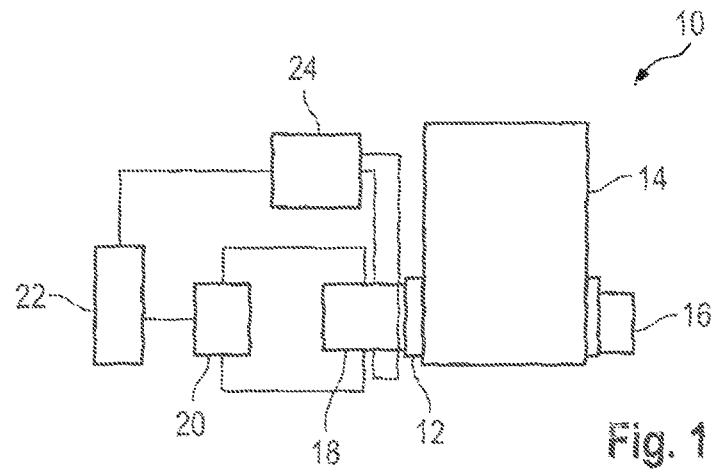
FIG. 1 is a schematic representation of a belt retractor.

In FIG. 1 a belt retractor 10 including a belt reel 12 onto which the webbing 14 can be wound is schematically shown. A belt tensioner 16 and a retractor motor 18 act on the belt reel 12. The retractor motor 18 has the function to wind up the webbing 14 onto the belt reel 12 prior to activating the belt tensioner 16 so far that the webbing is in contact with the vehicle occupant, i.e. a belt slack is eliminated prior to activating the belt tensioner 16.

In order to design said retracting operation as conveniently as possible for the vehicle occupant and not to irritate the latter, the webbing 14 is intended to be retracted as uniformly as possible and at moderate speed (comfort mode). Usually the speed of the retracting operation is measured by an additional speed sensor on the retractor motor 18 or on the belt reel 12 and the motor speed 18 is appropriately corrected. For this purpose, an additional speed sensor is required, however.

Figure 2:
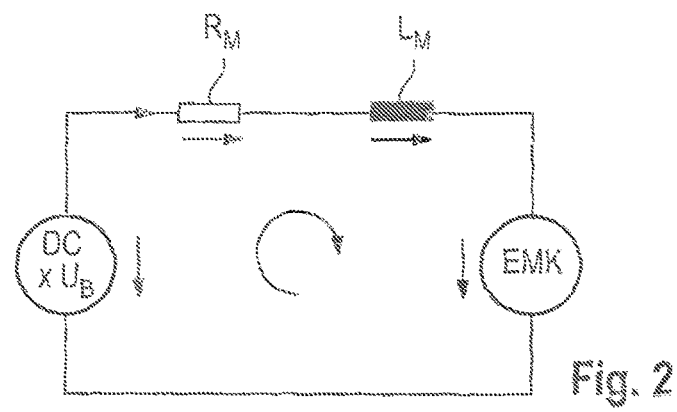
FIG. 2 is an electric equivalent diagram of an electric retractor motor of the belt retractor of FIG. 1.
Figure 3:
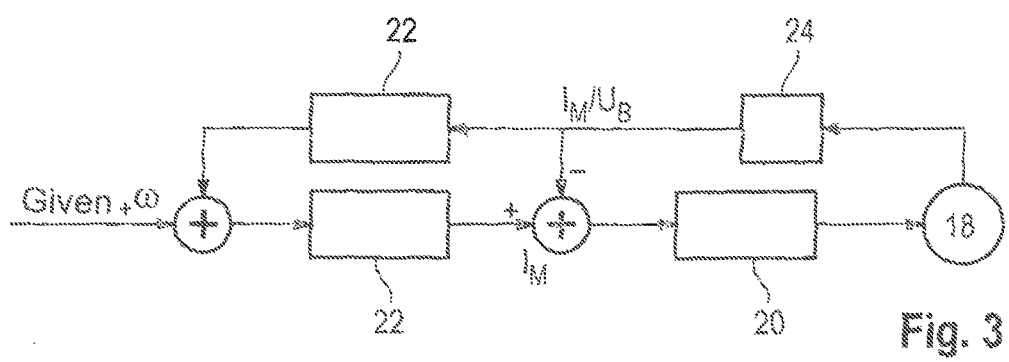
FIG. 3 is a flow diagram of the method according to the invention for controlling the motor speed of the electric retractor motor of the belt retractor of FIG. 1.

As is evident from FIG. 2, a DC voltage power source 20 which is coupled to a controller 22 is provided on the retractor motor 18. Furthermore, a measuring means 24 is provided which can measure the motor current applied to the retractor motor and the voltage applied to the retractor motor. Such measuring means 24 is coupled to the controller 22.

For controlling the motor speed of the retractor motor 18 in a first method step the motor current applied to the retractor motor as well as the voltage applied to the retractor motor 18 is measured.

After that, the time curve of the motor current and of the voltage will be established.

The electric substitute diagram of the retractor motor 18 and of the DC voltage source 20 is shown in FIG. 2. This can be represented as a series connection of the Ohmic motor resistance $R_M$, the motor inductivity $L_M$ and the generator voltage source EMK. Furthermore the DC voltage source DC·$U_B$ is shown.

The relationship of said parameters with the mechanical parameters of speed and torque of the retractor motor 18 can be represented by the following equation:

$$R_M \cdot I_M + L_M \cdot \frac{dI_M}{dt} + K_M \cdot \omega - U_M = 0$$

Furthermore the following applies $$M = K_M \cdot I_M$$

wherein $\omega$=angular speed of the rotor of the retractor motor
$U_M$=motor terminal voltage
$R_M$=motor resistance of the retractor motor
$I_M$=motor current applied to the retractor motor
$L_M$=motor inductivity of the retractor motor
$dI_M/dt$=time curve of the motor current applied to the retractor motor
$K_M$=motor constant.

This equation can be solved for the angular speed $\omega$ of the retractor motor so that the following equation is resulting:

$$\omega = \frac{U_M - R_M * I_M - L_M * \frac{dI_M}{dt}}{K_M}$$

All parameters of this equation are available to the motor controller 22 during the operation of the retractor motor 18. Either they can be established in advance and can be stored in a memory or they can be established by measuring on the retractor motor 18.

The motor terminal voltage $U_M$, viz. the voltage applied to the retractor motor, can be established, for example, from the duty factor of the pulse width modulation and the bridge supply voltage, wherein:

$$U_M = DC * U_B$$

DC=duty factor of the pulse width modulation
$U_B$=bridge supply voltage.

Hence the angular speed and the speed of the retractor motor 18 can be estimated based on this equation. The load moment M of the retractor motor 18 does not occur in the final equation so that the speed is estimated independently of the resistance acting on the webbing 14. In this way, even with a low resistance of the webbing 14, i.e. when a large belt slack is present, the webbing 14 is retracted slowly so that irritations for the vehicle occupant are avoided.

After having estimated the motor speed by way of said formula, it can be compared to a value defined before and the motor current can be adapted depending on the estimated motor speed. Subsequently, the motor current and the voltage are measured again and a new estimation of the motor speed is carried out.

This operation is repeated until the estimated motor speed has reached a defined value which corresponds to the desired retracting speed of the webbing 14.

Preferably, a pulse-width modulated operating voltage is established by measuring the curve of the voltage applied to the retractor motor. Said pulse-width modulated operating voltage enables an excellent estimation of the motor speed in the afore-mentioned equation so that said motor speed can be adjusted very precisely.

Alternatively, also an amplitude-modulated voltage may be established and the motor speed can be estimated by way of the same.

On the other hand, in the pre-crash mode, i.e. when a critical driving situation is given, retraction of the webbing and elimination of the belt slack are performed very quickly by maximum motor output.

The invention claimed is:

1. A method of controlling a motor speed of an electric retractor motor (18) of a belt retractor (10) for reducing belt slack in a comfort mode, comprising the following steps of:
    a) measuring a motor current ($I_M$) applied to the retractor motor (18) as well as a voltage applied to the retractor motor (18),
    b) estimating the motor speed by taking a time curve of the motor current ($I_M$) applied to the retractor motor (18), a time curve of the voltage as well as plural motor parameters ($R_M$, $I_M$, $K_M$) into account,
    c) modifying the motor current ($I_M$) in response to the estimated motor speed, and
    d) repeating the steps a) to c) until the estimated motor speed has reached a defined value.

2. The method according to claim 1, wherein a pulse-width modulated operating voltage ($U_B$) is established from the voltage curve.

3. The method according to claim 1, wherein the motor parameters ($K_M$) are the motor resistance ($R_M$) and the motor inductivity ($L_M$) of the retractor motor as well as a motor-dependent constant ($K_M$).

4. The method according to claim 1, wherein the motor speed is estimated by the following formula:

$$\omega = \frac{U_M - R_M * I_M - L_M * \frac{dI_M}{dt}}{K_M}$$

wherein
ω=angular speed of the rotor of the retractor motor
$U_M$=motor terminal voltage
$R_M$=motor resistance of the retractor motor
$I_M$=motor current applied to the retractor motor
$L_M$=motor inductivity of the retractor motor
$dI_M/dt$=time curve of the motor current applied to the retractor motor
$K_M$=motor constant.

* * * * *